US008223661B2

(12) United States Patent
Grand et al.

(10) Patent No.: US 8,223,661 B2
(45) Date of Patent: *Jul. 17, 2012

(54) PACKET TAG FOR SUPPORT OF REMOTE NETWORK FUNCTION/ PACKET CLASSIFICATION

(75) Inventors: Gerald Grand, Cumming, GA (US);
Niki R. Pantelias, Duluth, GA (US); R. Jeff Lee, Lawrenceville, GA (US);
Michael R. Zelnick, Suwanee, GA (US);
Francisco J. Gomez, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 11/522,442

(22) Filed: Sep. 18, 2006

(65) Prior Publication Data
US 2007/0091901 A1    Apr. 26, 2007

Related U.S. Application Data

(63) Continuation of application No. 10/032,100, filed on Dec. 31, 2001, now Pat. No. 7,110,398.

(60) Provisional application No. 60/261,272, filed on Jan. 12, 2001.

(51) Int. Cl.
*H04L 12/26* (2006.01)

(52) U.S. Cl. ......... 370/252; 370/392; 370/401; 370/466

(58) Field of Classification Search ................... 370/389, 370/466, 467, 469
See application file for complete search history.

(56) References Cited

U.S. PATENT DOCUMENTS
6,226,771 B1 * 5/2001 Hilla et al. .................... 714/758
(Continued)

OTHER PUBLICATIONS

"BCM3300 QAMLink® Single-Chip DOCSIS Cable Modem" [online], BCM3300 Product Brief, Broadcom Corporation (1999) [retrieved on Jun. 25, 2003]. Retrieved from the internet : <URL: http://www.broadcom/products/3300.html> (2 pages).

(Continued)

*Primary Examiner* — Chirag Shah
*Assistant Examiner* — Daniel Mitchell
(74) *Attorney, Agent, or Firm* — Sterne, Kessler, Goldstein & Fox PLLC (57) ABSTRACT

A method and system for creating an ethernet-formatted packet from an upstream DOCSIS packet. The upstream packet is first received along with packet characteristic data that is contained in physical layer prepend data and in the packet header. A packet tag is then created, based on the packet characteristic data. The packet characteristic data includes identifiers for the transmitting remote device and the channel over which the transmission is sent. Packet characteristic data also includes information about the physical characteristics of the transmission signal, such as the power level and time offset. The packet characteristic data also includes administrative information, such as the minislot count at which the packet is received and whether the packet was received in contention. The packet tag is appended to the payload of the upstream packet. Also appended to the payload is an encapsulation tag, and source and destination address headers. The result is a packet in an ethernet format. The resulting packet can therefore be sent using the ethernet protocol. The packet includes information that characterizes a DOCSIS packet. In a distributed cable modem termination system, this additional characterizing information can be used by processes further upstream, such as packet classification. An analogous operation can take place with respect to packets going downstream. Here, a DOCSIS packet is formed at an intermediate node, on the basis of a received ethernet-formatted packet.

23 Claims, 11 Drawing Sheets

U.S. PATENT DOCUMENTS

| | | | |
|---|---|---|---|
| 6,377,782 B1* | 4/2002 | Bishop et al. | 455/3.01 |
| 6,434,141 B1* | 8/2002 | Oz et al. | 370/352 |
| 6,438,123 B1* | 8/2002 | Chapman | 370/351 |
| 6,490,727 B1* | 12/2002 | Nazarathy et al. | 725/129 |
| 6,515,993 B1* | 2/2003 | Williams et al. | 370/395.53 |
| 6,557,031 B1* | 4/2003 | Mimura et al. | 709/218 |
| 6,633,564 B1* | 10/2003 | Steer et al. | 370/389 |
| 6,993,016 B1* | 1/2006 | Liva et al. | 370/356 |
| 7,039,048 B1* | 5/2006 | Monta et al. | 370/389 |
| 7,065,077 B1* | 6/2006 | Radhakrishnan et al. | 370/389 |
| 7,065,779 B1* | 6/2006 | Crocker et al. | 725/111 |
| 2001/0039600 A1* | 11/2001 | Brooks et al. | 710/126 |
| 2002/0065907 A1* | 5/2002 | Cloonan et al. | 709/223 |
| 2002/0083445 A1* | 6/2002 | Flickinger et al. | 725/35 |

OTHER PUBLICATIONS

"BCM3310 QAMLink® Communications Processor" [online], BCM3310 Product Brief, Broadcom Corporation (1999) [retrieved on Jun. 25, 2003]. Retrieved from the Internet: <URL: http://www.broadcom/products/3310.html> (2 pages).

"BCM3300 QAMLink® Single-Chip DOCSIS/EURODOCSIS Cable Modem" [online], BCM3300 Product Brief, Broadcom Corporation (2003) [retrieved on Sep. 25, 2003]. Retrieved from the Internet: <URL: http://www.broadcom.com/products/3300.html> (2 pages).

"BCM3310 QAMLink® Communications Processor" [online], BCM3310 Product Brief, Broadcom Corporation (2003) [retrieved on Sep. 25, 2003]. Retrieved from the Internet: <URL: http://www.broadcom.com/products/3310.html> (2 pages).

"Radio Frequency Interface Specification SP=RFIV1.1-105-00714" [online], Data-Over-Cable Service Interface Specifications, Cable Television Laboratories (200-07-14)[retrieved on Mar. 20, 2002]. Retrieved from the Internet: <URL: hhtp://www.docsis.org/docs/SP-RFIv1.1-105-000714.pdf> (p. 171, paragraph 8.4; p. 178, last paragraph: figures 8-11, 8-12, 8-13, 8-14, and 8-15).

Goldberg, L., "MCNS/DOCSIS MAC Clears a Path for the Cable-Modem Invasion," *Electronic Design* 45:69-70, 74, 78, and 80, Penton Publishing (Dec. 1, 1997).

Sumner, M. DOCSIS 1.1 Overview [online], Cable Labs (May 3, 1999) [retrieved on Apr. 18, 2001]. Retrieved from the Internet: URL:http://www.cablemodem.com/Euroll_Overview.pdf> (16 pages).

Quigley, T.J., "Cablemodem Standards for Advanced Quality of Service Deployments," *Consumer* Electronics pp. 282-283, ICCE (Jun. 022, 1999).

European Search Report for European Application No. 02250218.1, Issued on Aug. 7, 2003.

\* cited by examiner

PACKET TAG FOR SUPPORT OF REMOTE NETWORK FUNCTION/ PACKET CLASSIFICATION

CROSS-REFERENCE TO RELATED APPLICATIONS

This application is a continuation of U.S. application Ser. No. 10/032,100, filed Dec. 31, 2001, which claims the benefit of U.S. Provisional Application No. 60/261,272, filed Jan. 12, 2001, both of which are incorporated herein by reference in their entirety.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX

Not applicable.

BACKGROUND OF THE INVENTION

1. Field of the Invention

The invention described herein relates to communications systems, and more particularly to packet processing.

2. Background Art

In modem digital communications systems, communicating entities need to have a common, predetermined set of protocols and parameters. Given these protocols and parameters, the entities can communicate in an orderly, efficient manner. Such protocols and parameters are typically implemented according to general functionality. The various functions are often modeled and implemented as multiple layers of a protocol stack. Each layer represents additional protocols that a communicating entity must process, and/or parameters that must be adopted.

One example of a communications system standard protocol is described in the Data Over Cable System Interface Specification (DOCSIS). DOCSIS was originally conceived for cable communications systems. While DOCSIS can be applied to such systems, it is not necessarily limited to cable. Wireless communications systems, for example, can also operate under DOCSIS. Likewise, DOCSIS can be used in satellite communications systems.

DOCSIS can be used in communication systems that include a set of remote communications devices connected to a headend device, such that the headend is responsible for the management of communications both to and from the remotes. The headend is responsible for the distribution of information content to the remotes (the so-called "downstream" direction); in addition, the headend is responsible for management of communications in the other direction, from the remotes to the headend (the "upstream" direction). Generally, in addition to sending content to remotes, the headend issues downstream messages that instruct each remote as to when it can transmit upstream, and what kind of information it can send. In effect, the upstream bandwidth is controlled and allocated by the headend. Any given remote can transmit upstream only after requesting bandwidth and receiving a grant of the bandwidth from the headend. In a time division multiple access (TDMA) environment, bandwidth corresponds to one or more intervals of time. Moreover, the upstream can be organized into a number of channels, with several remotes assigned to each channel. This arrangement allows the headend to manage each upstream communications channel. In this manner, upstream communications are managed so as to maintain order and efficiency and, consequently, an adequate level of service.

In the realm of cable communications, DOCSIS specifies the requirements for interactions between a cable headend and associated remote cable modems. A cable headend is also known as a cable modem termination system (CMTS). DOCSIS consists of a group of specifications that cover operations support systems, management, and data interfaces, as well as network layer, data link layer, and physical layer transport. Note that DOCSIS does not specify an application layer. The DOCSIS specification includes extensive media access layer and physical (PHY) layer upstream parameter control for robustness and adaptability. DOCSIS also provides link layer security with authentication. This prevents theft of service and some assurance of traffic integrity.

The current version of DOCSIS (DOCSIS 1.1) uses a request/grant mechanism for allowing remote devices (such as cable modems) to access upstream bandwidth. DOCSIS 1.1 also allows the provision of different services to different parties who may be tied to a single modem. With respect to the processing of packets, DOCSIS 1.1 allows segmentation of large packets, which simplifies bandwidth allocation. DOCSIS 1.1 also allows for the combining of multiple small packets to increase throughput as necessary. Security features are present through the specification of 56-bit Data Encryption Standard (DES) encryption and decryption, to secure the privacy of a connection. DOCSIS 1.1 also provides for payload header suppression, whereby repetitive ethernet/IP header information can be suppressed for improved bandwidth utilization. DOCSIS 1.1 also supports dynamic channel change. Either or both of the downstream and upstream channels can be changed on the fly. This allows for load balancing of channels, which can improve robustness.

An alternative topology allocates some of the headend functionality to intermediate nodes between the headend and the remote devices. This is known as a distributed CMTS topology. There are several advantages to a distributed CMTS topology. First, relatively few remotes are connected to any given intermediate node. Because an intermediate node has its own PHY and MAC layer processing capability, the amount of bandwidth available to any single remote is increased. Second, a coaxial cable connection extends from a remote to an intermediate node, rather than all the way to a headend. This shorter coaxial cable path allows for higher order modulation methods. For these reasons, among others, a distributed CMTS topology can be preferable over the conventional topology of FIG. 1.

Such a choice, however, requires an appropriate digital communications protocol between the intermediate node and headend. The ethernet protocol is an appropriate solution. It is well understood, and supporting hardware and software are commercially available. A conversion problem remains, however. Packets moving between remote devices and the intermediate nodes are in the DOCSIS format. Communications between intermediate nodes and the headend, however, would use the ethernet protocol, which cannot typically handle a DOCSIS packet. A secondary problem arises in the fact that information stored in the PHY prepend and in the header fields of a DOCSIS packet is needed at the headend for packet classification and other administrative functions. Any conversion must therefore preserve this information.

Hence there is a need for a method and system by which a DOCSIS packet can be converted into a form that can be transmitted and processed using the ethernet protocol. Moreover, such a form would need to retain all the information that characterizes and normally accompanies a DOCSIS packet. This information could then be used by processes further upstream, such as packet classification.

BRIEF SUMMARY OF THE INVENTION

The invention described herein is a method and system for creating an ethernet-formatted packet from an upstream DOCSIS packet. The upstream packet is first received. A packet tag is then created, based on packet characteristic data associated with the upstream packet. The packet characteristic data includes administrative information, such as identifiers for the transmitting remote device, the channel over which the transmission is sent, the minislot count at which the packet is received, and whether the packet was received in contention. Packet characteristic data also includes information about the physical characteristics of the transmission signal, such as the power level and time offset.

The packet tag is appended to the payload of the upstream packet. Also appended to the payload is an encapsulation tag and source and destination address headers. The result is a packet in an ethernet format. The resulting packet can therefore be sent using the ethernet protocol. The packet includes information that characterizes the original upstream DOCSIS packet. In a distributed CMTS system, this additional characterizing information can be used by processes further upstream, such as packet classification.

An analogous operation can take place with respect to packets going downstream. Here, a DOCSIS packet is formed at an intermediate node, on the basis of a received ethernet-formatted packet.

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

Figure 1:
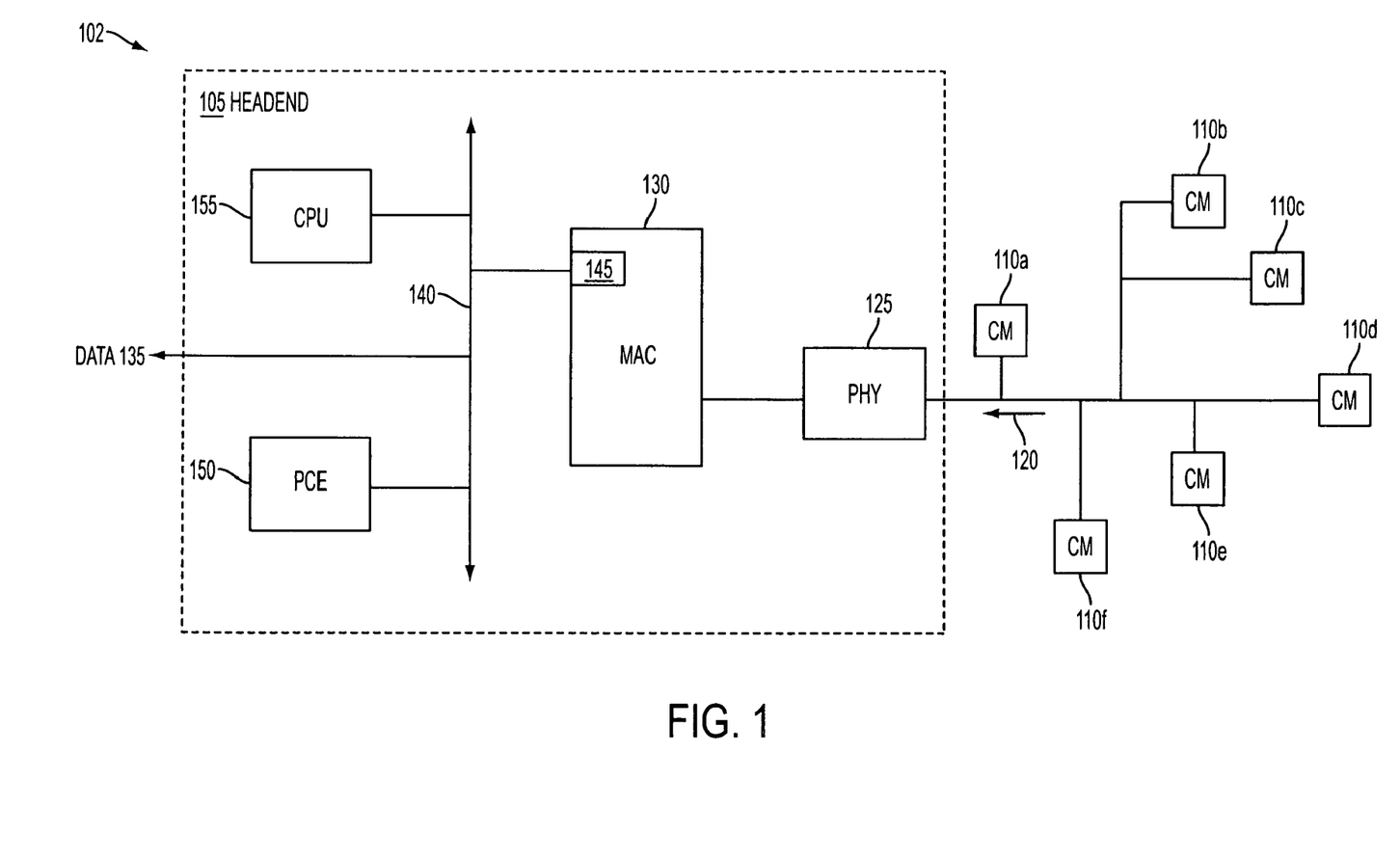
FIG. 1 illustrates a conventional topology featuring a headend and a set of connected cable modems.

A conventional topology for a cable communications system is illustrated in FIG. 1. A headend 105 is connected to several remote devices, such as cable modems (CM) 110a through 110f. An upstream transmission travels in direction 120, from a remote to headend 105.

Headend 105 includes a device 125 to handle physical layer (PHY) processing. After completion of PHY processing, upstream data is passed to a media access controller (MAC) 130 that performs media access layer processing. In some implementations, resulting data 135 can then be sent out from MAC device 130 via a packet port 145. The output path may include a bus 140.

MAC device 130 can also be connected to a packet classification engine (PCE) 150 and a central processing unit (CPU) 155, through bus 140. Packet classification, as performed by the PCE 150, includes the processing of data that relates to the upstream packet. PCE 150 needs to know the identity of the sending remote and its channel, for example. It also needs to know the minislot count on which a packet arrived, and whether there was contention for the minislot. PCE 150 also needs to know certain parameters of the packet, such as the amount of data it contains and the bit rate. This allows what DOCSIS calls "rate-shaping," the policing of received packets to ensure that they meet predetermined requirements. This packet characteristic data is typically made available to MAC 130 (and thereafter to PCE 150) through two sources. Some of the information is contained in the header of the DOCSIS packet; the rest is sent along with the DOCSIS packet in a separate field known as the PHY prepend.

Figure 2:
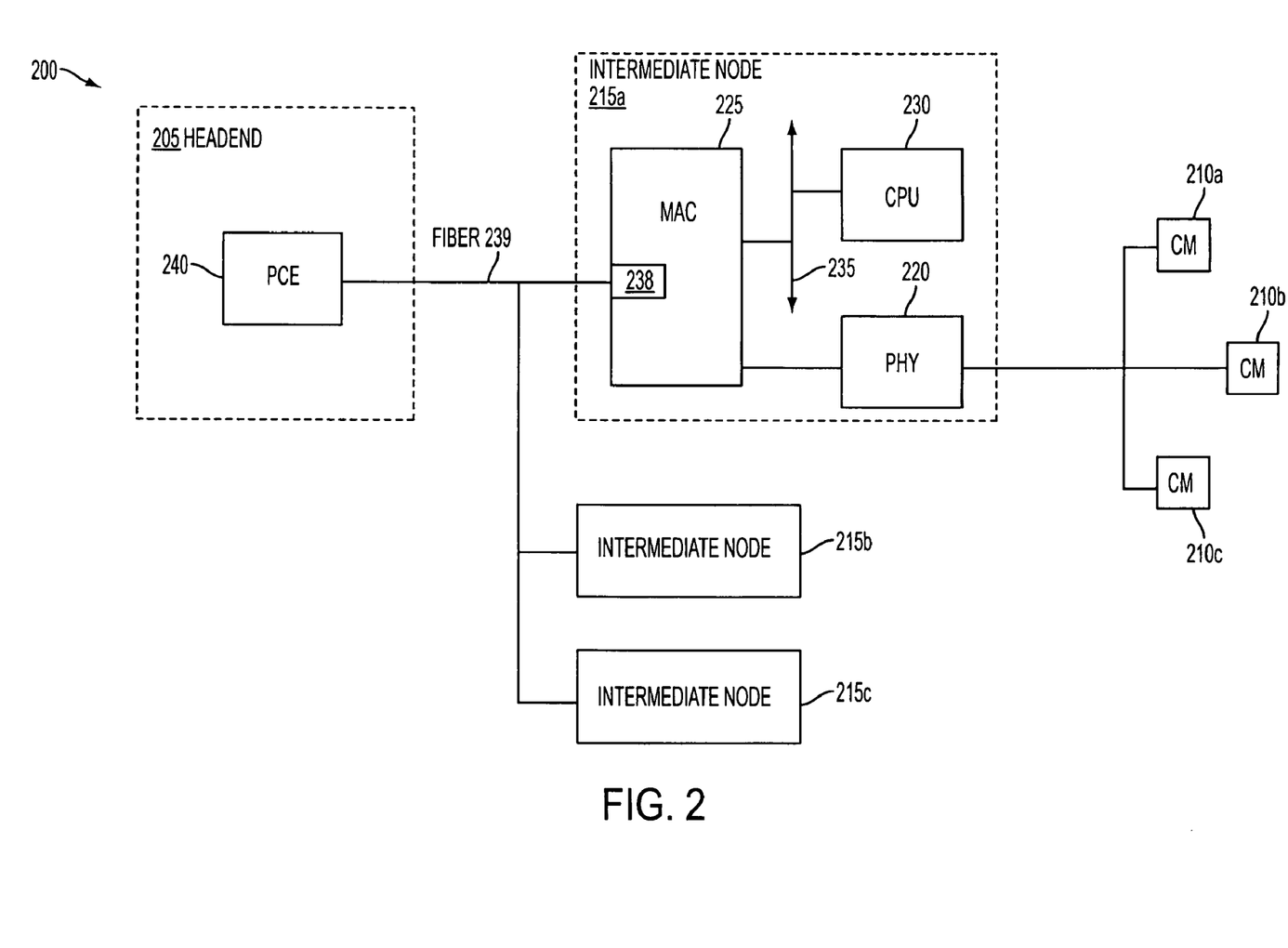
FIG. 2 illustrates a topology that features a headend, a set of connected cable modems, and one or more intermediate nodes between the headend and the cable modems.

An alternative topology is illustrated in FIG. 2. This topology allocates some of the headend functionality to intermediate nodes between the headend and remote devices. Such an arrangement can therefore be viewed as a distributed CMTS topology. A headend 205 is connected to one or more remote devices, such as cable modems (CM) 210a through 210c. Between headend 205 and cable modems 210a through 210c is an intermediate node 215a. Intermediate node 215a contains a PHY device 220 and a MAC 225. A CPU 230 can be connected to MAC device 225 through a bus 235, internal to intermediate node 215a. After completion of media access layer processing, MAC device 225 outputs upstream data through a packet port 238 to headend 205. Connectivity between intermediate node 215a and headend 205 can be an effected using a fiber optic path 239. The headend 205 can then perform subsequent processing on the upstream data, such as packet classification. In the example of FIG. 2, packet classification is performed by a packet classification engine 240 internal to headend 205.

Note that multiple intermediate nodes can be associated with a single headend in a distributed CMTS topology. FIG. 2 shows three intermediate nodes, 215a through 215c, all associated with headend 205. Each intermediate node can service multiple remote devices.

The invention described herein is a method and system for creating an ethernet formatted packet that is based on an upstream DOCSIS packet. The upstream DOCSIS packet is first received along with PHY prepend data. A packet tag is then created, based on packet characteristic data contained in the DOCSIS packet header and the PHY prepend. The packet characteristic data includes identifiers for the transmitting remote device, the channel over which the transmission is sent, the minislot count at which the packet is received, and an indication of whether the packet was received in contention. Packet characteristic data also includes information about the physical characteristics of the transmission, such as the power and time offset of the signal.

The packet tag is appended to the payload of the upstream packet. Also appended to the payload is an encapsulation tag and source and destination address headers. The result is a packet in an ethernet format. The resulting packet can therefore be sent using the ethernet protocol. The resulting packet includes all the information that characterizes and otherwise accompanies a DOCSIS packet. In a distributed CMTS system, the packet characteristic data (now carried in the packet tag of the ethernet-formatted packet) can be used by processes further upstream, such as packet classification.

An analogous operation can take place with respect to packets going downstream. Here, a DOCSIS packet is formed at an intermediate node, on the basis of a received ethernet formatted packet.

II. Upstream

A. System

Figure 3:
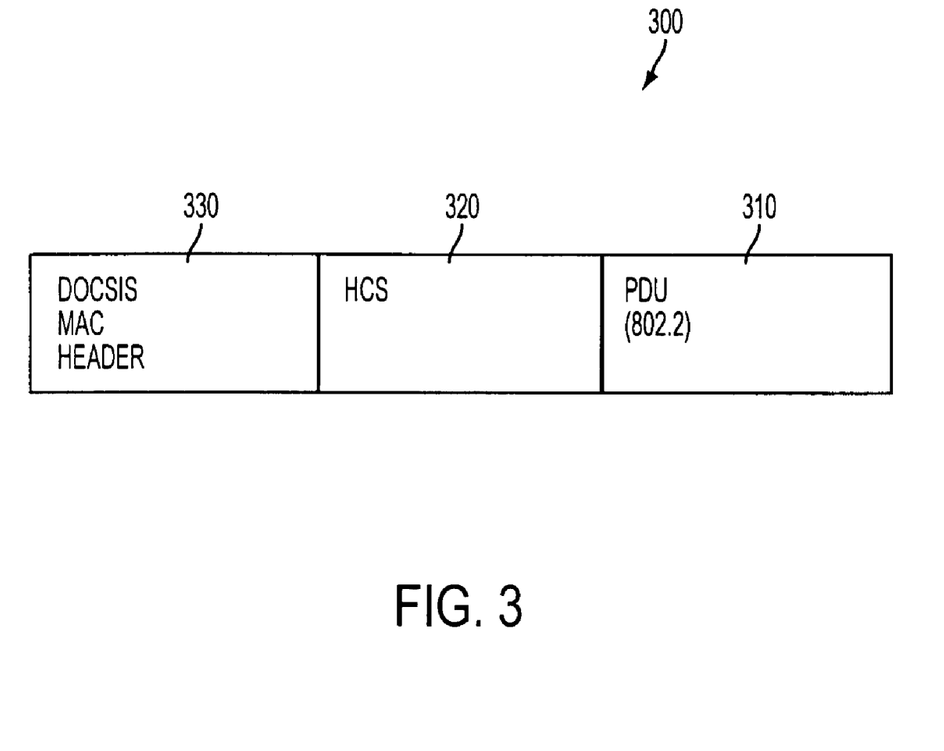
FIG. 3 is an example of an upstream DOCSIS-formatted packet.

With respect to upstream communications, the system of the invention operates on a DOCSIS packet received at an intermediate node. DOCSIS packets, in general, are formatted as shown in FIG. 3. Here, a DOCSIS packet 300 includes a payload 310. Payload 310 is sometimes referred to as a protocol data unit (PDU) and can be formatted according to the IEEE 802.3 standard. Appended to payload 310 is a header check sequence (HCS) 320. HCS 320 is a mathematical function of DOCSIS header 330 and is used to detect errors in header 330. Header 330 includes information on the type of the frame, and the length of the payload 310. If the DOCSIS extended header feature is being used, DOCSIS header 330 also includes the extended header length and the extended header itself. An extended header provides packet-specific information such as the type of encryption used and payload header suppression information.

Figure 4:
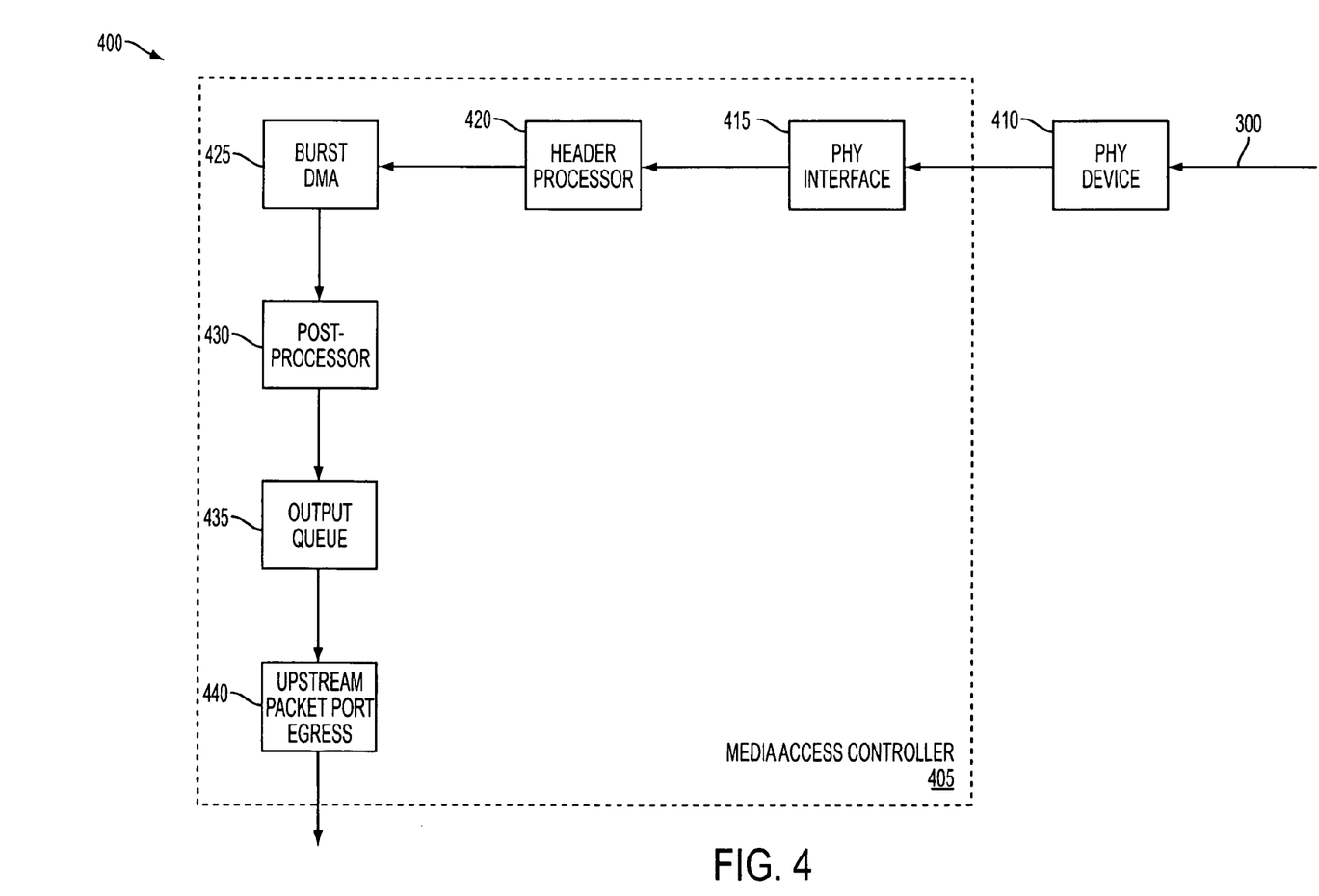
FIG. 4 is a block diagram of a system for converting an ethernet-formatted packet into a DOCSIS-formatted packet, according to the invention.

An embodiment of a system that converts such a packet into an ethernet-formatted packet is illustrated in FIG. 4. System 400 includes a MAC 405 and a PHY device 410. As described above, system 400 resides at an intermediate node between remote devices and the headend. In system 400, a DOCSIS packet, such as packet 300, enters a physical layer device 410. PHY device 410 performs physical layer processing and, in so doing, removes the PHY overhead field from packet 300. One example of such a PHY device is the BCM3138, available from BROADCOM Incorporated of Irvine, Calif. PHY device 410 interfaces with MAC 405 through an interface 415. Interface 415 accepts packet 300 along with PHY prepend data from PHY device 410. Interface 415 extracts encryption information from the DOCSIS header, e.g., whether decryption is required. The plaintext data and PHY prepend information is then sent to header processor 420. Processor 420 parses the DOCSIS header to extract the DOCSIS packet length, the extended header elements, and the identifier of the sending remote, also known as the burst service identifier (SID), from the byte stream.

A burst direct memory access (DMA) module 425 receives the data stream from the header processor 420. The burst DMA module 425 stores packet characteristic data from the PHY prepend and DOCSIS header. As described above, packet characteristic data from the DOCSIS header can include the packet length, extended header information, and the burst SID. Packet characteristic data from the PHY prepend can include physical characteristics of the burst(s) associated with the packet, such as the power of the burst and frequency and time offsets of the burst, plus equalizer coefficients calculated by the PHY device.

In post-processor 430, if packet header suppression is indicated, the corresponding PHS rule is fetched. The cyclic redundancy code (CRC) over the payload is checked. Embedded PHS extended header elements are located, the header check sequence is verified, and reserved extended headers are extracted. Payload headers are then expanded, and a new CRC is generated.

Post-processing module 430 must then determine the appropriate output queue for the packet based on the purpose and priority of the packet. For example, post processing module 430 determines if a packet is a MAC management message by examining the type field originally received in the DOCSIS header. If the packet is not a MAC management message, the priority (high or low) is determined. A selected output queue is shown in FIG. 4 as queue 435.

From output queue 435, the packet is sent for upstream packet port egress processing at module 440. Egress module 440 removes packets from the assorted queues and encapsulates these packets in an ethernet-formatted packet containing packet tag information that is described in greater detail below. The egress module 440 then sends the encapsulated packet out of the packet port GMII interface. The processing of egress module 440 is described more fully below.

Figure 5:
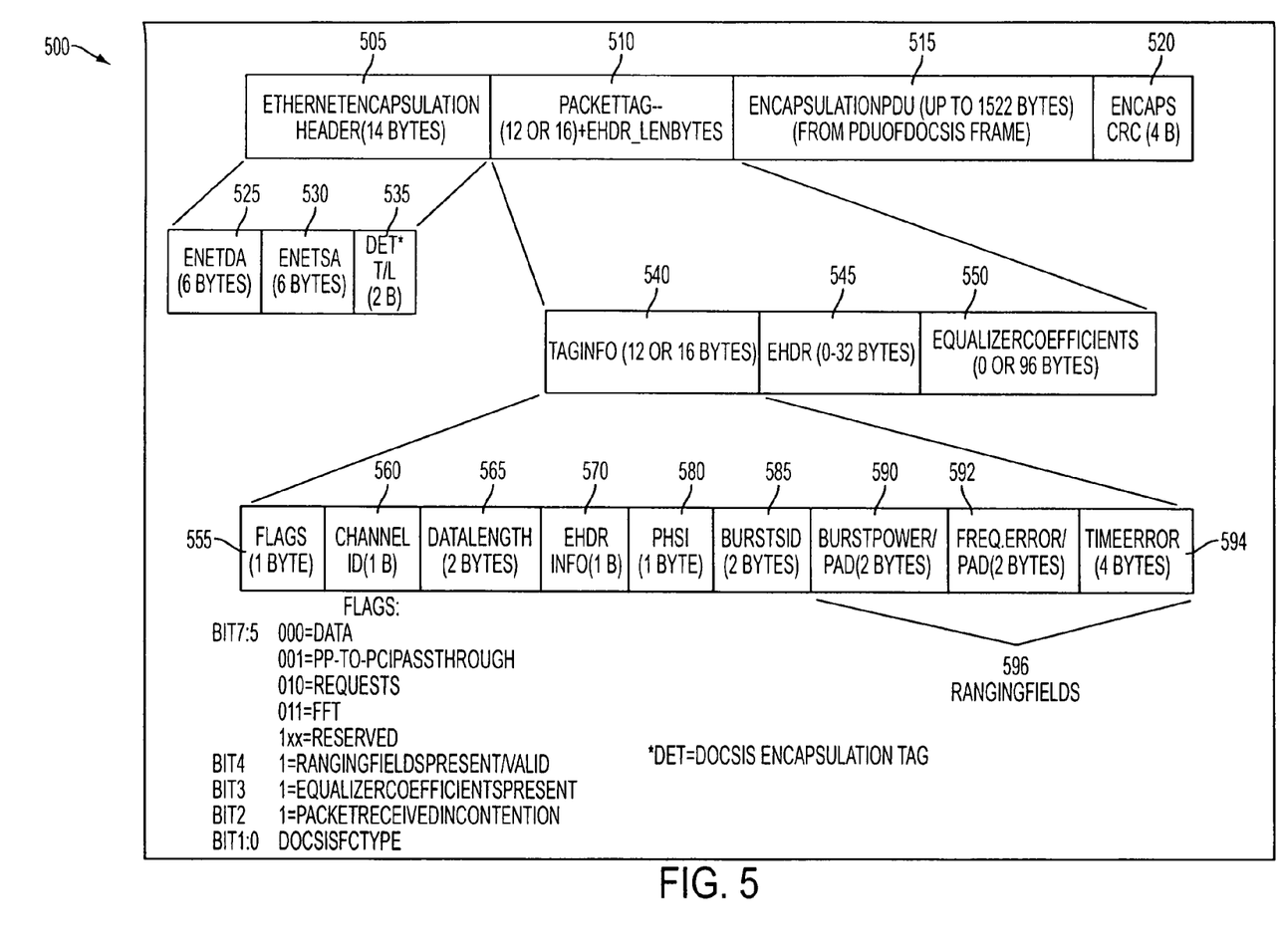
FIG. 5 illustrates an exemplary upstream ethernet-formatted packet.

The result is an ethernet-formatted packet illustrated in FIG. 5. Packet 500 includes an ethernet encapsulation header 505, a packet tag 510, an encapsulation PDU 515, equivalent to the original DOCSIS packet payload, and a CRC 520 for the encapsulation PDU 515. The ethernet encapsulation header 505 comprises an ethernet destination address (DA) 525, a source address (SA) 530, and a DOCSIS encapsulation tag (DET) 535. DA 525 refers to an entity that will perform further processing on the packet and the packet characteristic data. DA 525 can refer, for example, to the packet classification engine at the headend. SA 530 refers to the source of packet 500, e.g., the MAC in which packet 500 is created in its present form. DET 535 serves to identify this packet as having the format diagramed in FIG. 5, i.e., an encapsulated, ethernet format.

Packet tag 510 includes a tag information field 540, an extended header field 545, and equalizer coefficients 550. Tag information 540 includes a set of flags 555 that provide information as to how the packet should be processed further upstream. In the embodiment shown, flags 555 include indications as to whether ranging fields are present, whether equalizer coefficients are present, whether packet 500 was received in contention, whether packet 500 is a management message, and the output queue in which packet 500 had been stored.

Tag information 540 also includes a channel identifier 560 which indicates the upstream channel on which the DOCSIS packet was originally received. Tag information 540 also includes a data length field 565, which provides the length, in bytes, of encapsulation PDU 515. Extended header information field 570 provides the length of the extended header field 545. Tag information 540 also includes a packet header suppression index (PHSI) 580, which can be used to look up a rule for payload header expansion. Burst service identifier (SID) 585 indicates the remote ID that was provided by the physical layer device for the burst(s) associated with this packet arrived. Tag information 540 also includes a burst power field 590 that contains the power level for this burst as observed by the upstream physical layer device. Frequency error field 592 contains the frequency offset for this burst as observed by the upstream physical layer device. Finally, tag information 540 also includes a time error field 594 which contains the time offset for this burst, again, as noted by the upstream physical layer device. Fields 590 through 594 are used when the burst is a ranging burst. Hence, these fields can be viewed collectively as ranging fields 596.

B. Method

Figure 6:
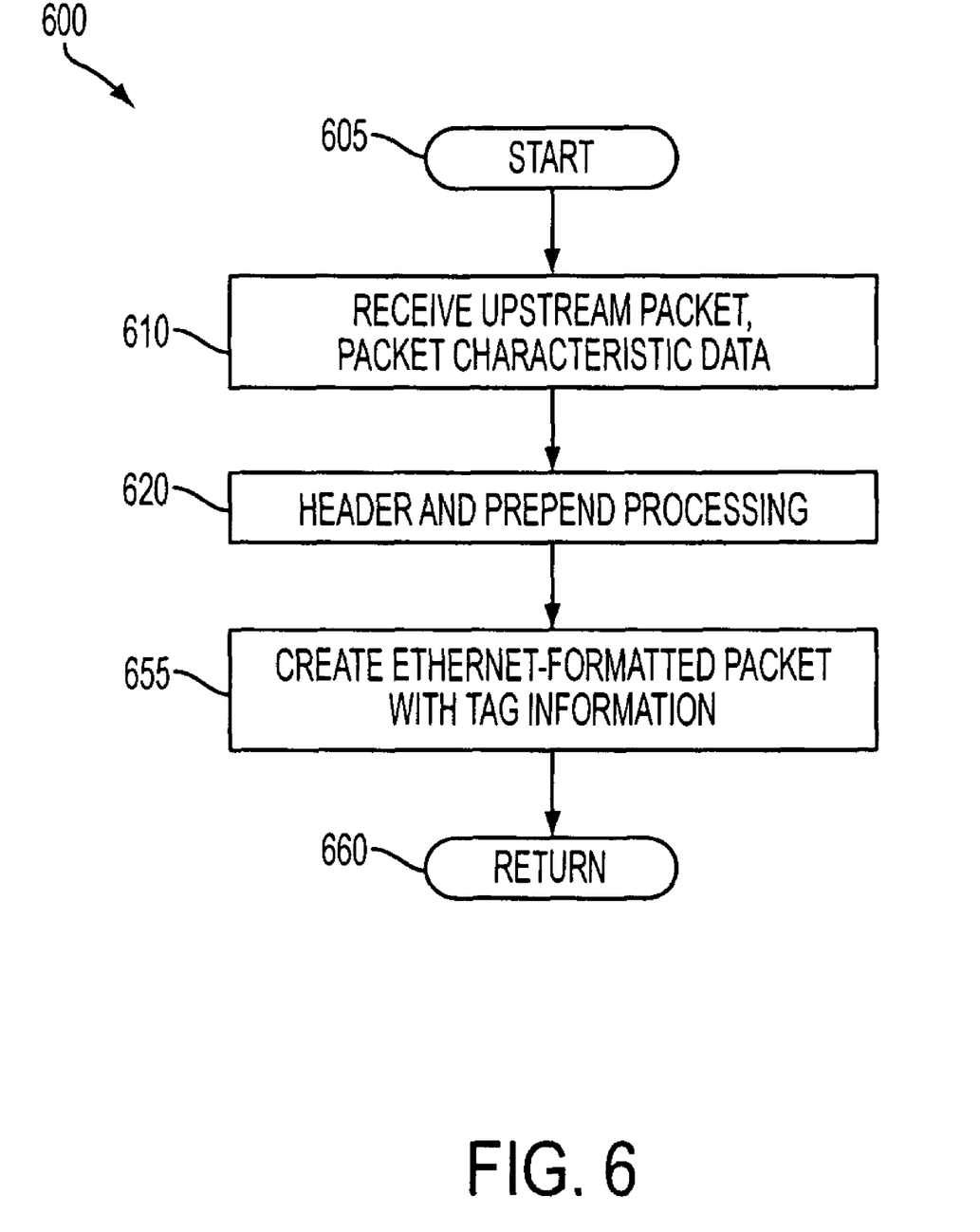
FIG. 6 illustrates a method of converting a DOCSIS-formatted packet to an ethernet-formatted packet.

The process of converting an upstream DOCSIS packet into an ethernet-formatted packet is illustrated in FIG. 6. The process begins with step 605. In step 610, an upstream packet with its associated packet characteristic data is received at an intermediate node. In step 620, header and prepend processing is performed. This includes decryption as necessary; extraction, from the DOCSIS packet header, of information needed to form packet header 510; and header expansion, as necessary.

Figure 7:
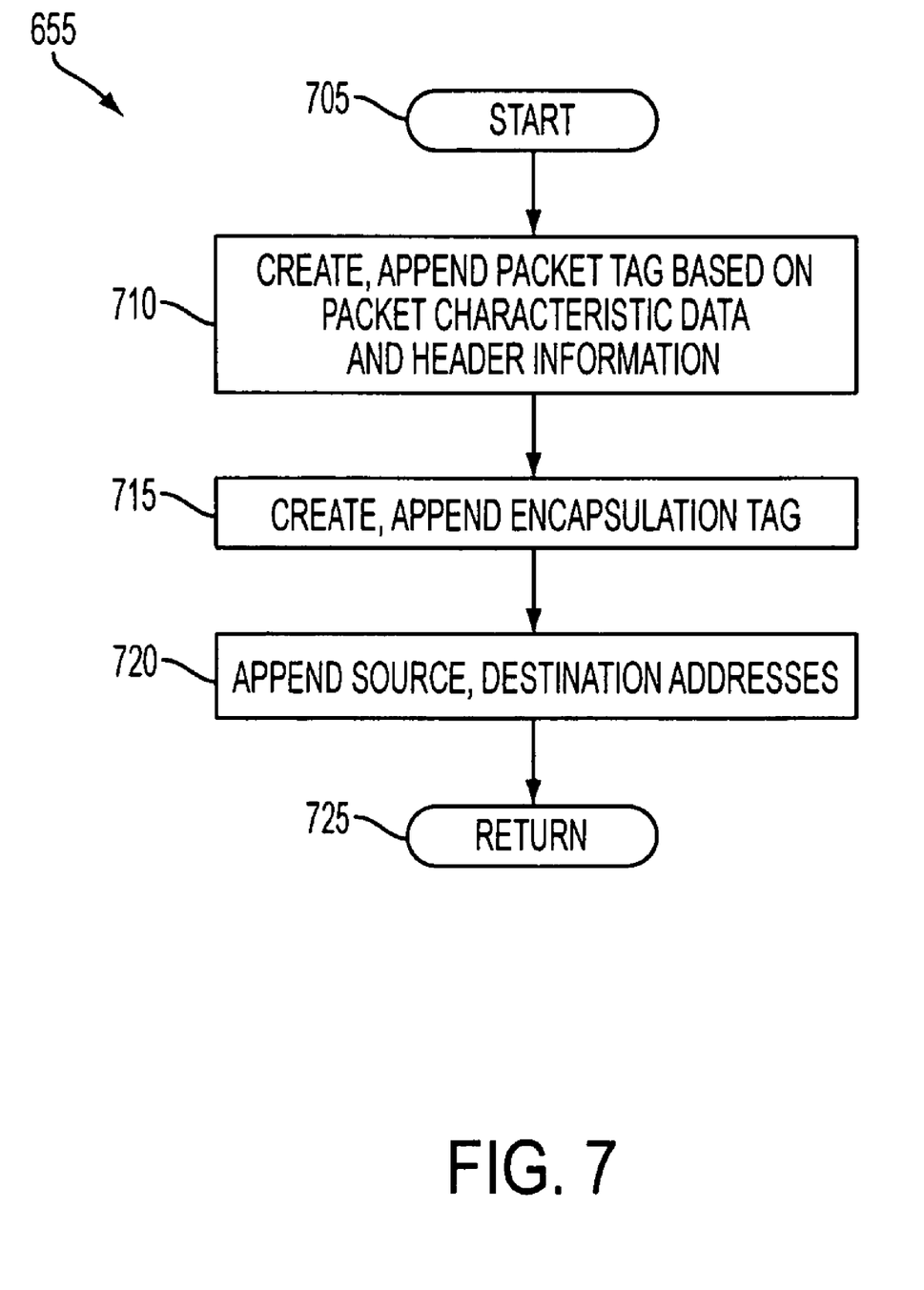
FIG. 7 illustrates a method of constructing an ethernet-formatted packet.

The step of creating an ethernet-formatted packet having the necessary tag information, step 655, is illustrated in greater detail in FIG. 7. The process begins at step 705. In step 710, a packet tag, based on packet characteristic data and header information, is created and appended to the DOCSIS payload. In step 715, the DOCSIS encapsulation tag is created and appended. The content of the packet tag and encapsulation tag are illustrated in FIG. 5 and described above. In step 720, source and destination addresses are appended. The process concludes at step 725. The process of FIG. 7 is performed by egress module 440.

Note that after the completion of this process, the resulting ethernet-formatted packet may be longer than the maximum acceptable length specified in the IEEE 802.3 standard. In an embodiment of the invention, the ethernet-formatted packet is left at this length and forwarded upstream. This is feasible in light of the fact that much of the commercially available ethernet equipment can process longer packets without adverse effects.

In an alternative embodiment, however, ethernet-formatted packets that exceed a specified maximum size undergo fragmentation. Here, the PDU is broken up into two or more segments. Each segment is then treated as a PDU for two or more corresponding ethernet packets. Each resulting packet will have the same ethernet encapsulation header. Moreover, each such packet would have a packet tag that would identify the original unfragmented PDU, and identify which segment of that PDU is contained in this packet. This would allow eventual reassembly at the destination.

III. Downstream

A. System

Figure 8:
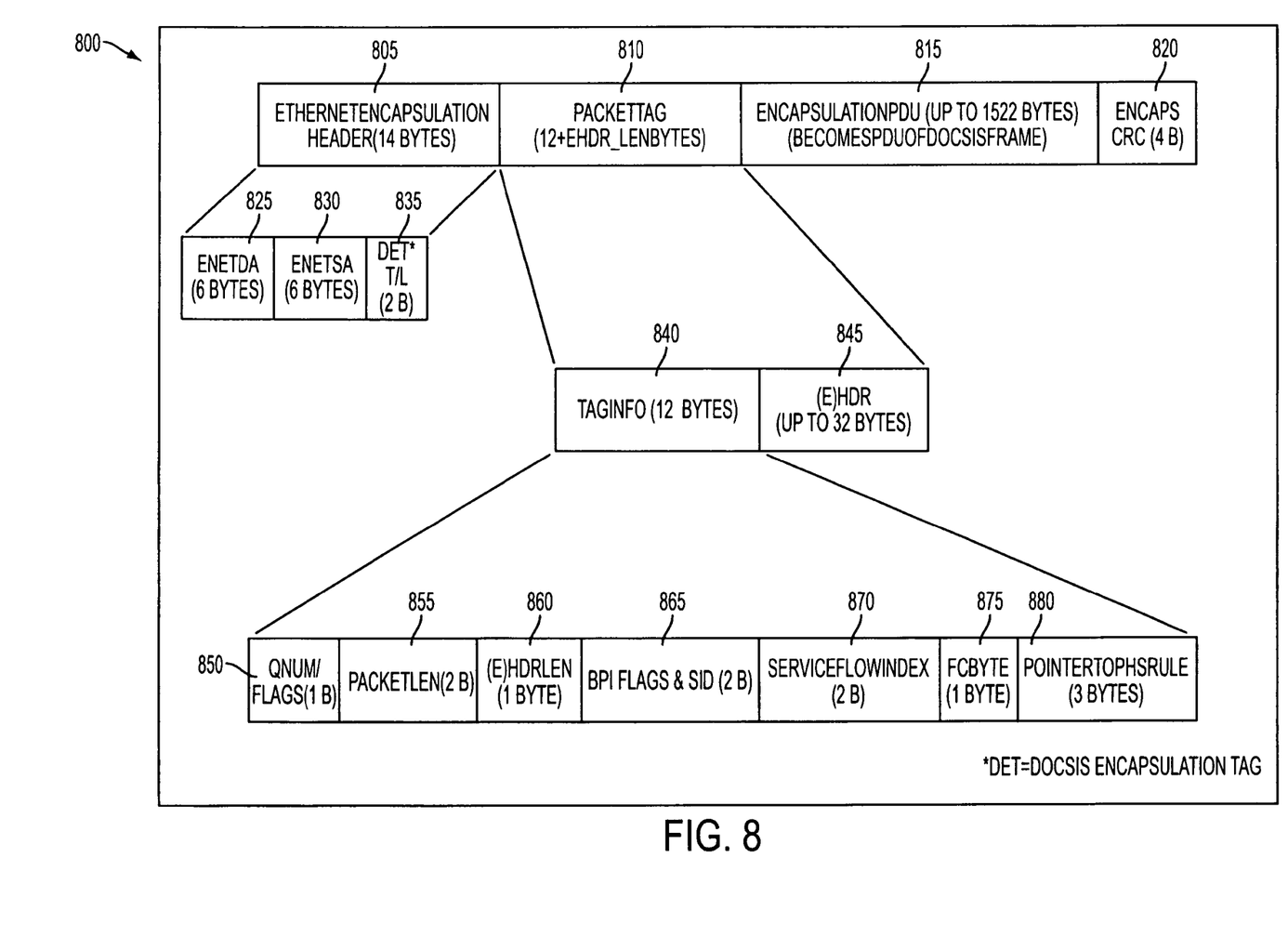
FIG. 8 illustrates a downstream ethernet-formatted packet prior to conversion to a DOCSIS-formatted packet.

Given an intermediate node topology such as that of FIG. 2, a downstream ethernet-formatted packet can be converted at an intermediate node to a DOCSIS-formatted packet. An example of such an ethernet-formatted packet is shown in FIG. 8. Packet 800 includes an ethernet encapsulation header 805, a packet tag 810, and an encapsulation PDU 815. Packet 800 also includes an encapsulation CRC 820.

Ethernet encapsulation header 805 contains ethernet destination and source addresses 825 and 830 respectively. Ethernet encapsulation header 805 also includes a DOCSIS encapsulation tag 835.

Packet tag 810 includes tag information 840 and extended header 845. Within tag information 840, the first field 850 includes a queue number that identifies the appropriate destination queue of this packet. Field 850 also includes a set of flags that indicate whether certain functions are to be performed, such as payload header suppression and CRC generation. Field 855 contains the packet length. Tag information 840 also includes an extended header length field 860, which indicates the length of the extended header. Field 865 includes flags that indicate whether baseline privacy is to be implemented, i.e., whether encryption is to be performed. If so, this field also includes address information that allows a specific encryption key to be retrieved.

Tag information 840 also includes a service flow index 870. This value is used to index management information base (MIB) tables, which contain network management information on a per flow basis, e.g., the duration of a given flow. Frame control (FC) byte 875 includes the FC type and FC parameter to be used by the DOCSIS header creation module. The FC type identifies a packet as either a data packet or a management packet. If the packet is a management packet, the FC parameter specifies the type of management packet. Finally, tag information 840 includes a pointer 880 that points to the appropriate payload header suppression rule in memory. This pointer is valid only if payload header suppression is indicated in field 850.

Figure 9:
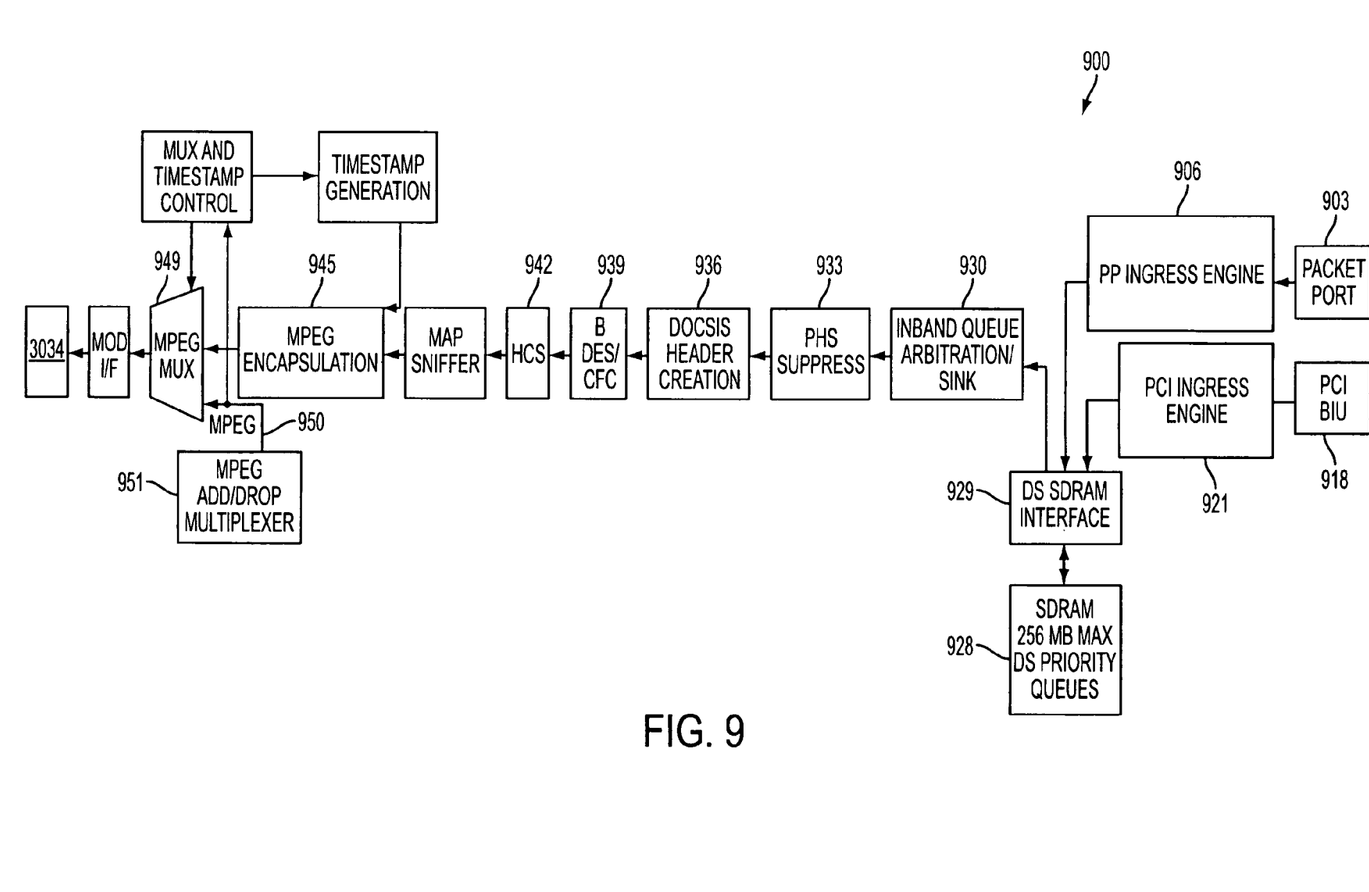
FIG. 9 is a block diagram of a system for converting an ethernet-formatted packet into a DOCSIS-formatted packet.

A block diagram of a system that transforms such an ethernet-formatted packet to a DOCSIS-formatted packet is shown in FIG. 9, according to an embodiment of the invention. Packets entering system 900 can enter either through packet port 903 or PCI interface 918. Packets entering through packet port 903 will have a DOCSIS IP tag associated with each packet. This tag contains information about the packet with respect to baseline privacy, payload header suppression, and other DOCSIS-specific functions. Packets entering through packet port 903 are passed to a packet port ingress engine 906. Engine 906 finds the packet boundaries and extracts the DOCSIS encapsulation type (DET) tag. Packets are then stored in memory 928.

Packets entering through PCI interface unit 918 are passed to a PCI ingress engine 921. Packets from PCI ingress engine 921, like those from packet port ingress engine 906, are stored in memory 928.

In-band queue arbitration/sink module 930 controls the order in which packets are pulled from memory 928. When a packet is pulled from memory, some of the descriptor information is passed to payload header suppression (PHS) module 933. This information includes an indication of whether payload header suppression is to be performed and, if so, which suppression rule is to be applied. If payload header suppression is performed, the appropriate bytes in the packet are suppressed and the length of the PDU is updated in the descriptor information. The modified PDU and the descriptor information are then sent to DOCSIS header creation module 936.

DOCSIS header creation module 936 creates a DOCSIS header which will include extended headers for PHS if suppression was performed and for baseline privacy if descriptor flags indicate that encryption is to be performed. The DOCSIS header will also include any reserved extended header information which was passed in the descriptor or tag. Header creation module 936 determines the length field in the DOCSIS header. Module 936 then passes the complete DOCSIS header, with the packet, to the DES/CRC module 939.

DES/CRC module 939 checks the DOCSIS header to see whether a CRC is to be generated. If so, DES/CRC module 939 generates a CRC. DES/CRC module 939 then checks the header to see whether encryption is indicated. If so, this module performs encryption on the packet.

After DES/CRC module 939 has finished any encryption, this module passes the packet to HCS generation module 942.

HCS generation module 942 calculates and adds the header check sequence over the DOCSIS header. HCS generation module 942 then passes the packet to the MPEG encapsulation engine 945.

MPEG encapsulation engine 945 controls how packets are mapped into an MPEG stream through MPEG multiplexer 949. In one embodiment of the invention, the DOCSIS stream that comes from engine 945 is the only source of MPEG traffic on the channel and can occupy the entire bandwidth. In an alternative embodiment, an MPEG master stream 950 is provided by an MPEG add/drop multiplexer 951. In this case, the output of the MPEG encapsulation engine 945 is inserted into the master MPEG stream 950 when an idle frame appears. In either embodiment, the output of the MPEG multiplexer 949 is an MPEG stream containing the DOCSIS packet, as transformed from an incoming ethernet-formatted packet.

B. Method

Figure 10A:
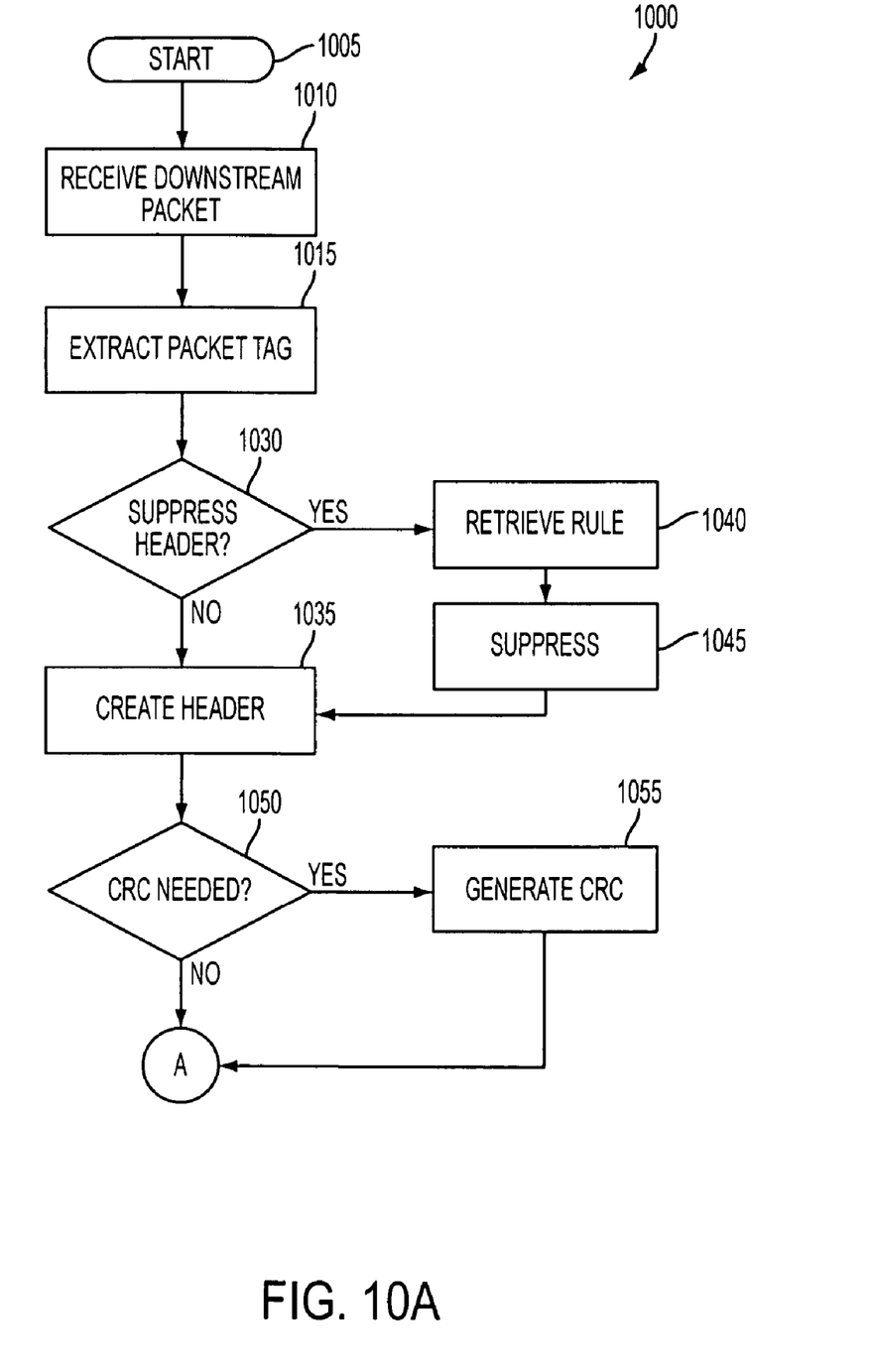
FIG. 10A and 10B illustrate a method of converting an ethernet-formatted packet to a DOCSIS-formatted packet.
Figure 10B:
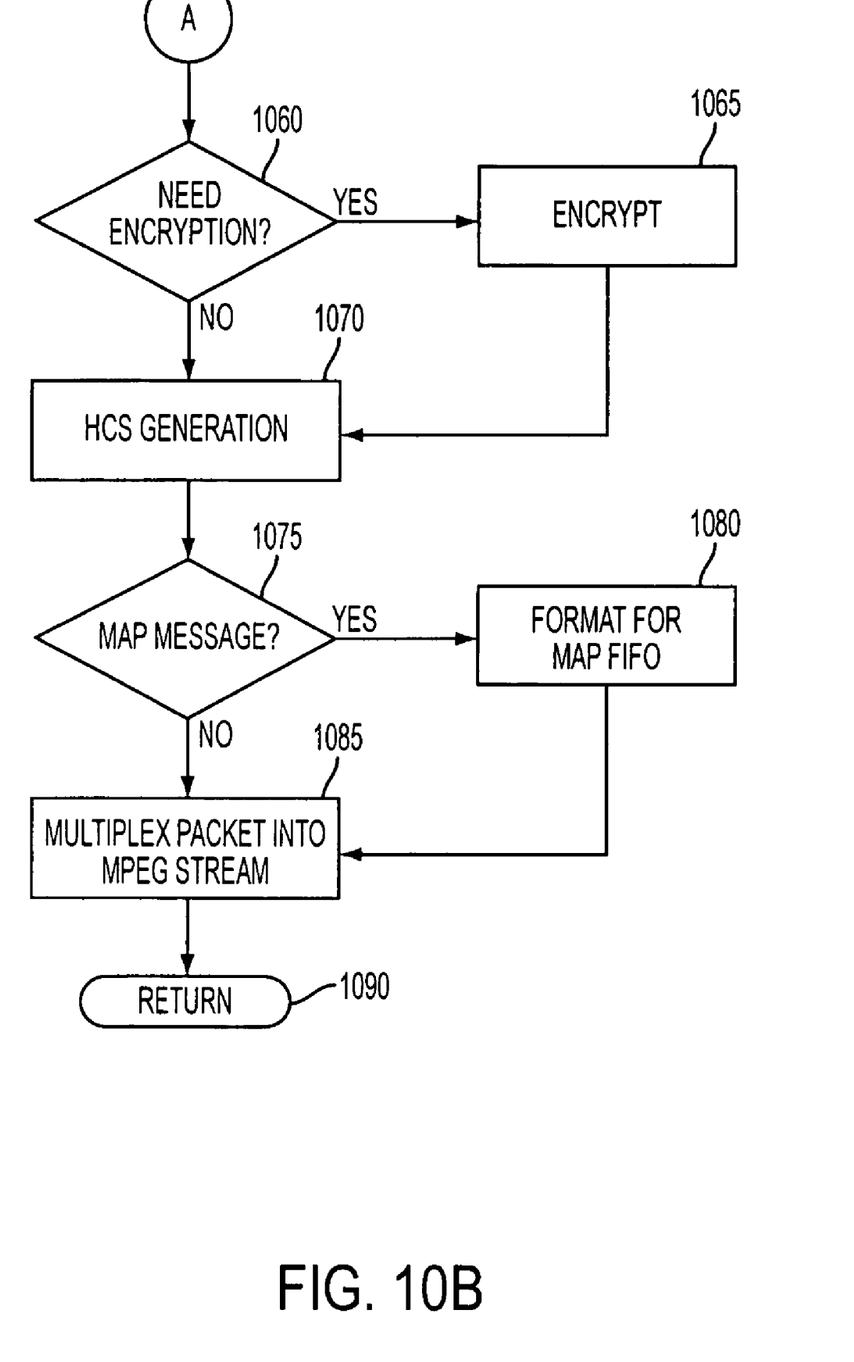

The method by which an incoming downstream ethernet-formatted packet is converted to a DOCSIS packet is illustrated in FIGS. 10A and 10B. The process begins at step 1005. In step 1010, the downstream ethernet-formatted packet is received. Given the topology of FIG. 2, the downstream packet is received at an intermediate node.

In step 1030, a determination is made as to whether header suppression needs to take place. If not, then processing continues at step 1035. If, however, header suppression is necessary, then in step 1040, the appropriate rule for header suppression is retrieved. In step 1045, header suppression takes place according to the retrieved rule. In step 1035, the DOCSIS header is created.

In step 1050, a determination is made as to whether a CRC is required. If so, then in step 1055, the CRC is generated. In step 1060, a determination is made as to whether encryption is needed. If so, then encryption is performed in step 1065. In step 1070, an HCS is generated.

In step 1075, a determination is made as to whether the packet represents a MAP message. If so, then in step 1080, the message is formatted for a MAP FIFO. Processing then continues at step 1085, where the packet is multiplexed into an MPEG stream. The process concludes at step 1090.

IV. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of creating and transmitting an ethernet-formatted packet, based on an upstream DOCSIS packet, comprising the steps of:
    receiving the upstream DOCSIS packet from a cable modem, comprising an upstream header and a payload;
    appending a source address header, a destination address header including an ethernet destination address and a DOCSIS encapsulation tag (DET) in a type/length field of an ethernet encapsulation header to the payload to generate the ethernet-formatted packet; wherein the DET identifies the ethernet-formatted packet as a DOCSIS packet encapsulated in an ethernet-format; and
    transmitting the ethernet-fomatted packet to a cable modern termination system (CMTS).

2. The method of claim 1, further comprising:
    receiving physical layer data that comprises information indicating physical characteristics of the upstream DOCSIS packet, and that comprises physical layer prepend data;
    appending a packet header, based on the physical layer data and on an upstream packet header, to the payload of the upstream DOCSIS packet; and
    appending an encapsulation tag to the payload of the upstream DOCSIS packet;
    wherein the physical layer prepend data includes information indicating burst power, a burst frequency, a time offset, and equalizer coefficients.

3. The method of claim 1, further comprising:
    receiving packet characteristic data for the DOCSIS packet, the packet characteristic data including at least one of: identifiers for the cable modem that generated the DOCSIS packet, the channel over which the DOCSIS packet was transmitted, the minislot count for the DOCSIS packet and whether the DOCSIS packet was received in contention.

4. A system to create and transmit an ethernet formatted packet, based on an upstream DOCSIS packet, comprising:
    a physical layer (PHY) interface configured to receive, from a cable modem, the upstream DOCSIS packet and physical layer data that comprises information indicating physical characteristics of the upstream packet, said information comprising a PHY prepend;
    a header processor configured to extract additional packet characteristic data from an upstream header of the upstream DOCSIS packet; and
    an upstream packet port egress module configured to encapsulate a payload of the upstream DOCSIS packet with tag information based on said upstream header and on said physical layer data, to form the ethernet-formatted packet and transmit the ethernet formatted packet to a cable modem termination system (CMTS).

5. The system of claim 4, wherein the system is incorporated in a point-to multi-point communications system.

6. The system of claim 5, wherein said point-to multi-point communications system comprises wireless communications media.

7. The system of claim 5, wherein said point-to multi-point communications system comprises satellite communications media.

8. The system of claim 5, wherein said point-to multi-point communications system comprises fiber optic communications media.

9. The system of claim 4, wherein the upstream packet port egress module is configured to append a DOCSIS encapsulation tag (DET) in a type/length field of an ethernet encapsulation header to the payload to generate the ethernet-formatted packet; wherein the DET identifies the ethernet-formatted packet as a DOCSIS packet encapsulated in an ethernet-format.

10. A method of creating and transmitting a DOCSIS packet, based on a downstream ethernet packet, comprising the steps of:
    receiving the downstream ethernet packet from a cable modem termination system (CMTS), wherein the downstream ethernet packet includes a DOCSIS encapsulation tag (DET) in a type/length field of an ethernet encapsulation header;
    creating a downstream DOCSIS header for the ethernet packet and appending the DOCSIS header to the ethernet packet to create the DOCSIS packet; and
    transmitting the DOCSIS packet to a cable modem.

11. The method of claim 10, further comprising the step of: mapping the DOCSIS packet into an MPEG stream.

12. The method of claim 10, further comprising the step of: extracting a packet tag from the downstream ethernet packet, wherein the packet tag comprises a packet length.

13. The method of claim 10, further comprising the step of extracting a packet tag from the downstream ethernet packet, wherein the packet tag comprises a header length, 14. The method of claim 10, further comprising the step of: extracting a packet tag from the downstream ethernet packet, wherein the packet tag comprises an indication of whether the CRC is to be generated.

15. The method of claim 10, further comprising:
extracting a packet tag from the downstream ethernet packet;
reading a payload header suppression (PHS) rule from a memory location indicated by the packet tag and performing PHS according to the PHS rule if PHS is indicated by a flag in the packet tag;
generating a cyclic redundancy check (CRC) if indicated by the packet tag;
encrypting the downstream ethernet packet if indicated by the packet tag;
generating a header check sequence (HCS); and
formatting the MAP message in a MAP FIFO format to create the DOCSIS packet if the downstream ethernet packet contains a MAP message.

16. A system for creating a DOCSIS-formatted packet based on a downstream ethernet packet, comprising:
a packet port ingress engine configured to receive the downstream ethernet packet from a cable modem termination system (CMTS), wherein the downstream ethernet packet includes a DOCSIS encapsulation tag (DET) in a type/length field of an ethernet encapsulation header; and
a header creation module for creating a DOCSIS header on the basis of a packet descriptor format and appending said DOCSIS header to a payload of the downstream ethernet packet to generate the DOCSIS-formatted packet.

17. The system of claim 16, further comprising an encapsulation module for mapping said DOCSIS-formatted packet into an MPEG stream.

18. The system of claim 16, wherein the system is incorporated in a point-to multi-point communications system.

19. The system of claim 18, wherein said point-to multi-point communications system comprises wireless communications media.

20. The system of claim 18, wherein said point-to multi-point communications system comprises satellite communications media.

21. The system of claim 18, wherein said point-to multi-point communications system comprises fiber optic communications media.

22. The system of claim 16, wherein the packet port ingress engine is further configured to extract a tag from the downstream ethernet packet, and convert the tag to a packet descriptor format.

23. The system of claim 22, further comprising:
a payload header suppression (PHS) module configured to perform PHS when indicated by a flag in said tag.

* * * * *

UNITED STATES PATENT AND TRADEMARK OFFICE
CERTIFICATE OF CORRECTION

| | | |
|---|---|---|
| PATENT NO. | : 8,223,661 B2 | Page 1 of 1 |
| APPLICATION NO. | : 11/522442 | |
| DATED | : July 17, 2012 | |
| INVENTOR(S) | : Gerald Grand | |

It is certified that error appears in the above-identified patent and that said Letters Patent is hereby corrected as shown below:

Title page, item (56), Other Publications section, replace "Cable Moden" with --Cable Modem--.

Title Page 2, (Col. 2), item (56), Other Publications section, replace "Jun. 022" with --Jun. 22--.

Column 9, lines 66-67, replace "modern" with --modem--.

Column 10, Line 60, replace "modern" with --modem--.

Signed and Sealed this
Twenty-third Day of October, 2012

David J. Kappos
*Director of the United States Patent and Trademark Office*